(12) United States Patent
Nakamoto et al.

(10) Patent No.: US 10,916,952 B2
(45) Date of Patent: Feb. 9, 2021

(54) SECONDARY BATTERY SYSTEM

(71) Applicants: Hirofumi Nakamoto, Kyoto (JP); Zempachi Ogumi, Kyoto (JP); Takeshi Abe, Kyoto (JP)

(72) Inventors: Hirofumi Nakamoto, Kyoto (JP); Zempachi Ogumi, Kyoto (JP); Takeshi Abe, Kyoto (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 19 days.

(21) Appl. No.: 15/587,795

(22) Filed: May 5, 2017

(65) Prior Publication Data

US 2017/0346316 A1 Nov. 30, 2017

(30) Foreign Application Priority Data

May 30, 2016 (JP) ................................. 2016-107271

(51) Int. Cl.
    *H01M 4/00*     (2006.01)
    *H02J 7/00*     (2006.01)
    (Continued)

(52) U.S. Cl.
    CPC .............. *H02J 7/0042* (2013.01); *H01M 4/38* (2013.01); *H01M 4/582* (2013.01); *H01M 10/05* (2013.01);
    (Continued)

(58) Field of Classification Search
    CPC ........ H02J 7/0042; H02J 7/007; H01M 10/46; H01M 4/582; H01M 10/425; H01M 4/38;
    (Continued)

(56) References Cited

U.S. PATENT DOCUMENTS

| 2008/0102373 | A1* | 5/2008 | Potanin | H01M 4/0492 |
| | | | | 429/309 |
| 2010/0021800 | A1* | 1/2010 | Yazami | H01M 4/133 |
| | | | | 429/50 |
| 2014/0242474 | A1* | 8/2014 | Matsui | H01G 11/54 |
| | | | | 429/338 |

FOREIGN PATENT DOCUMENTS

| CN | 101341614 A | 1/2009 |
| CN | 103703602 A | 4/2014 |

(Continued)

OTHER PUBLICATIONS

Gschwind et al. "Fluoride ion batteries: Theoretical performance, safety, toxicity, and a combinatorial screening of new electrodes" Journal of Fluorine Chemistry, vol. 182, Feb. 2016, pp. 76-90 (Year: 2016).*

*Primary Examiner* — Nicholas P D'Aniello

(74) *Attorney, Agent, or Firm* — Sughrue Mion, PLLC

(57) ABSTRACT

An object of the present disclosure is to provide a secondary battery system that functions at high voltage. The present disclosure attains the object by providing a secondary battery system comprising: a hybrid ion battery provided with a cathode active material layer having a cathode active material that contains a metal element capable of taking two kinds or more of a positive valence, an anode active material layer having an anode active material that contains a metal element capable of taking a valence of +2 or more, and an electrolyte layer containing an alkali metal ion and fluoride anion, and formed between the cathode active material layer and the anode active material layer; and a controlling portion that controls charging and discharging of the hybrid ion battery; wherein the controlling portion controls discharging so that a potential of the cathode active material includes a potential range higher than 0.23 V (vs. SHE).

7 Claims, 4 Drawing Sheets

(51) Int. Cl.
    *H01M 4/38*     (2006.01)
    *H01M 10/42*     (2006.01)
    *H01M 4/58*     (2010.01)
    *H01M 10/05*     (2010.01)
    *H01M 10/0585*     (2010.01)
    *H01M 10/46*     (2006.01)
    *H01M 4/02*     (2006.01)

(52) U.S. Cl.
    CPC ..... *H01M 10/0585* (2013.01); *H01M 10/425* (2013.01); *H01M 10/46* (2013.01); *H02J 7/007* (2013.01); *H01M 2004/028* (2013.01)

(58) Field of Classification Search
    CPC ............. H01M 10/0585; H01M 10/05; H01M 2004/028
    See application file for complete search history.

(56) References Cited

FOREIGN PATENT DOCUMENTS

| | | |
|---|---|---|
| JP | 2013-145758 A | 7/2013 |
| WO | 2007/146453 A2 | 12/2007 |

\* cited by examiner

SECONDARY BATTERY SYSTEM

TECHNICAL FIELD

The present disclosure relates to a secondary battery system that works at a high voltage.

BACKGROUND ART

Lithium ion batteries are known as an example of batteries with high voltages and high energy densities. Li ion batteries are cation-based batteries utilizing Li ions as the carriers. On the other hand, fluoride ion batteries utilizing fluoride ions (fluoride anions) as the carriers are known as an anion-based battery.

For example, Patent Literature 1 discloses an electrochemical cell (fluoride ion battery) comprising a cathode, an anode, and an electrolyte material capable of conducting anion charge carriers ($F^-$). Also, Patent Literature 1 exemplifies materials such as $AgF_x$ and $CuF_x$ as the cathode active material.

CITATION LIST

Patent Literature

Patent Literature 1: Japanese Patent Application Laid-Open No. 2013-145758

SUMMARY OF DISCLOSURE

Technical Problem

From the viewpoint of allowing a battery to have high density energy, a secondary battery system that works at a high voltage has been demanded. The present disclosure has been made in view of the actual circumstances, and a main object thereof is to provide a secondary battery system that works at a high voltage. Incidentally, conducting a fluoride ion ($F^-$) alone is not easy; thus, there are some cases to conduct thereof as a fluoride anion (such as a fluoride complex anion). Considering this point, the term fluoride anion may be used in some cases.

Solution to Problem

To achieve the object, the present disclosure provides a secondary battery system comprising: a hybrid ion battery provided with a cathode active material layer having a cathode active material that contains a metal element capable of taking two kinds or more of a positive valence, an anode active material layer having an anode active material that contains a metal element capable of taking a valence of +2 or more, and an electrolyte layer containing an alkali metal ion and fluoride anion, and formed between the cathode active material layer and the anode active material layer; and a controlling portion that controls charging and discharging of the hybrid ion battery; wherein the controlling portion controls discharging so that a potential of the cathode active material includes a potential range higher than 0.23 V (vs. SHE).

According to the present disclosure, using the cathode active material that contains a metal element capable of taking two kinds or more of a positive valence, and contributing both the alkali metal ion and the fluoride anion (fluoride ion) to the electrode reaction allow the secondary battery system to work at a high voltage.

In the present disclosure, the metal element is preferably at least one of Fe, Co, V, Mn, Ti, and Cr.

In the present disclosure, the cathode active material is preferably at least one of a metal fluoride, a metal acid fluoride, and a simple substance of metal.

Advantageous Effects of Disclosure

The present disclosure produces effects such that a secondary battery system that works at a high voltage can be provided.

DESCRIPTION OF EMBODIMENTS

The secondary battery system of the present disclosure is hereinafter described in details.

Figure 1:
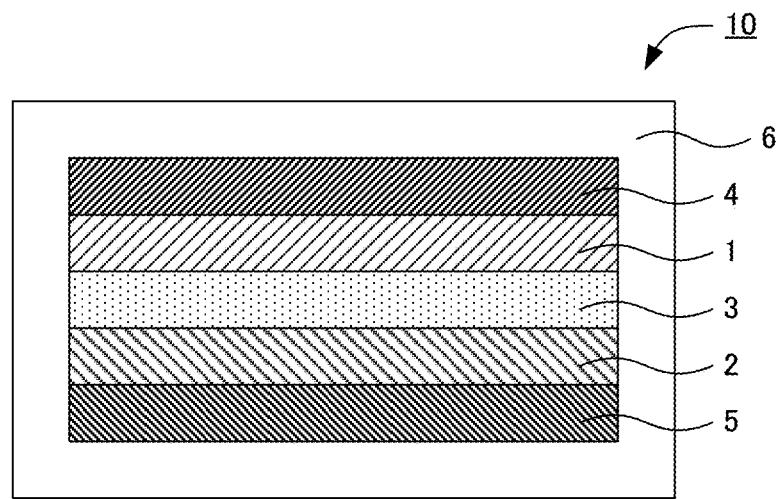
FIG. 1 is a schematic cross-sectional view illustrating an example of the hybrid ion battery in the present disclosure.

FIG. 1 is a schematic cross-sectional view illustrating an example of the hybrid ion battery in the present disclosure. Hybrid ion battery 10 shown in FIG. 1 has cathode active material layer 1 containing a cathode active material, anode active material layer 2 containing an anode active material, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. Hybrid ion battery 10 features a configuration that cathode active material layer 1 contains a cathode active material, of which alkali metal ions and fluoride anions (fluoride ions) contribute to an electrode reaction.

Figure 2:
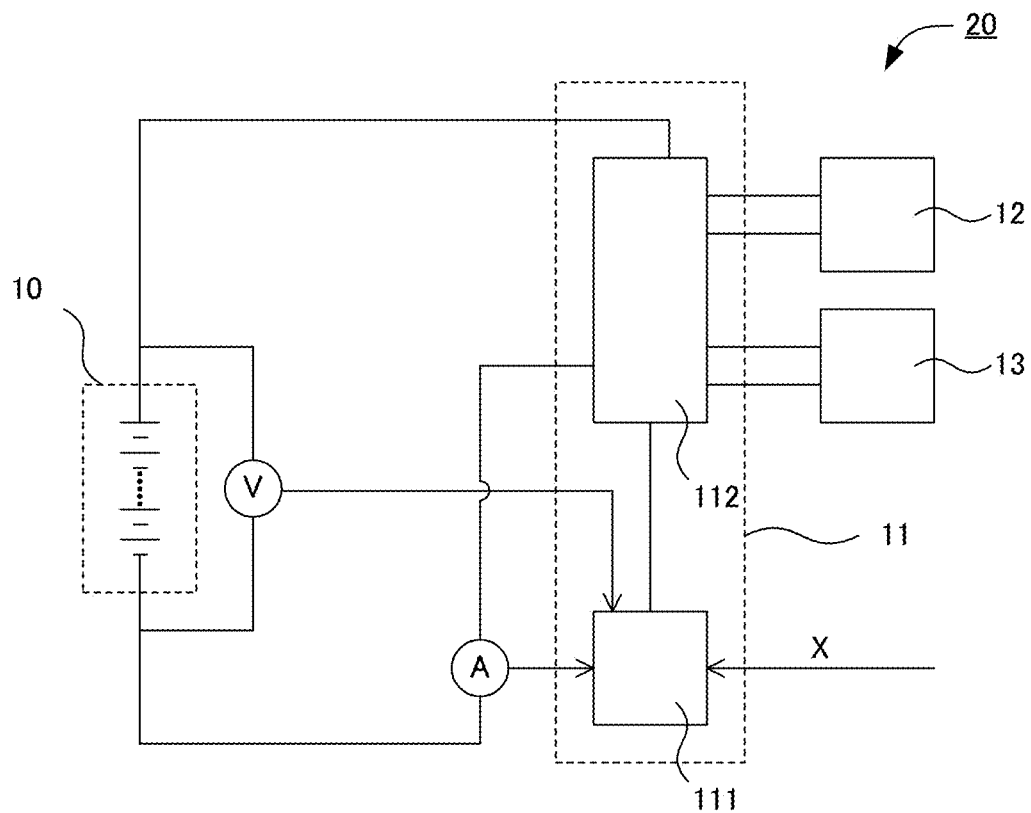
FIG. 2 is a schematic diagram illustrating an example of the secondary battery system of the present disclosure.

FIG. 2 is a schematic diagram illustrating an example of the secondary battery system of the present disclosure. Secondary battery system 20 shown in FIG. 2 comprises at least hybrid ion battery 10 and controlling portion 11 that controls charging and discharging of hybrid ion battery 10. Controlling portion 11 has units such as ECU (Electronic Control Unit) 111 and PCU (Power Control Unit) 112. ECU (Electronic Control Unit) 111 sends charge and discharge commands (such as the start command and the stop command) to PCU 112, based on request X from outside (such as the charge request or the discharge request) and voltage V and current A of hybrid ion battery 10. PCU 112 supplies electricity to load 12 during discharging, and receives electricity from power source 13 during charging. Controlling portion 11 features a configuration that controls discharging so that the potential of the cathode active material includes a specific high potential range.

According to the present disclosure, using the cathode active material that contains a metal element capable of taking two kinds or more of a positive valence, and contributing both the alkali metal ion and fluoride anion (fluoride ion) to the electrode reaction allow the secondary battery system to work at a high voltage. Here, in conventional fluoride ion batteries, usually, fluoride anions (fluoride ions) are reacted with cathode active materials. Typically, the fluorinating and defluorinating reactions of cathode active materials (mainly metal) are utilized, but the reaction potential is often low in that case. In contrast, the reaction potential of cathode active materials becomes high in the environment where not only fluoride anions (fluoride ions) but also alkali metal ions are present. The reason why the reaction potential of the cathodes becomes high is presumed to be as follows. During discharging, it is presumed that the fluoride anions (fluoride ions) in the active material react with the ambient alkali metal ions, and thus the metal element in the active material receives the electrons, so that the reaction causing a valence change proceeds to allow the reaction potential of the cathode to be high. During charging, it is presumed that the reaction causing a valence change proceeds since the fluoride anions (fluoride ions) react with the metal element in the cathode active material. As the result, it is presumed that increasing voltages is more achievable than in conventional fluoride ion batteries.

In addition, reactions in a hybrid ion battery are presumed to be represented by the following formulae in a high voltage region and a low voltage region. Incidentally, $M_+$ represents a cathode active material, $M_-$ represents an anode active material, and A represents an alkali metal element.

<High Voltage Region>

$$M_+F_3 + A^+ + e^- \rightarrow M_+F_2 + AF \text{ (elution)} \rightarrow M_+F_2 + A^+ + F^-$$
(discharge)

Cathode: $M_+F_2 + A^+ + F^- \rightarrow M_+F_3 + A^+ + e^-$ (charge)

Electrolyte layer: $AF \leftrightarrow A^+ + F^-$

Anode: $_xM_- + _yF^- \leftrightarrow {_z}M_-F_y + (x-z)M_- + ye^-$

<Low Voltage Region>

Cathode: $M_+F_2 + 2e^- \leftrightarrow M_+ + 2F^-$

Electrolyte layer: $F^-$ transportation

Anode: $(x-z)M_- + y(x-z)F^- \leftrightarrow (x-z)M_-F_y + y(x-z)e^-$

It is presumed that the battery functions as a usual fluoride ion battery in the low voltage region, and functions as a conversion-type (valence change reactive type) battery in the high voltage region.

Furthermore, according to the present disclosure, using an anode active material that contains a metal element capable of taking a valence of +2 or more, and contributing the fluoride anion (fluoride ion) to the electrode reaction allow a secondary battery system with high safety. Here, in conventional lithium ion batteries, usually, Li ions (univalent cations) are reacted with anode active materials. For example, when a Li metal (univalent metal) is used as an anode active material to intend a battery with higher capacity, cycle properties could be degraded due to Li dendrites, and the safety could also be degraded. In contrast, according to the present disclosure, the growth of the alkali metal dendrites can be inhibited by using an anode active material that contains a metal element capable of taking a valence of +2 or more, and thus the improvement of the safety can be achieved. Moreover, using an anode active material that contains a metal element capable of taking a valence of +2 or more allows the reaction to proceed to a higher valence than the valence when a Li compound is used as the anode active material for example; thus, the high energy densification can be achieved.

Also, according to the present disclosure, discharging is controlled so as to include at least a specific high potential in the potential range of the cathode active material. The high potential is utilized so that the high energy densification can be achieved.

The secondary battery system of the present disclosure is hereinafter described in each constitution.

1. Hybrid Ion Battery

The hybrid ion battery in the present disclosure comprises a cathode active material layer, an anode active material layer, and an electrolyte layer formed between the cathode active material layer and the anode active material layer.

(1) Cathode Active Material Layer

The cathode active material layer in the present disclosure is a layer having a cathode active material that contains a metal element capable of taking two kinds or more of a positive valence.

The cathode active material contains a metal element capable of taking two kinds or more of a positive valence; for example, this metal element is preferably capable of taking at least two kinds of a positive valence among +1, +2, +3, +4, and +5 and more preferably capable of taking at least two kinds or more of a positive valence among +2, +3, and +4.

Examples of the metal element may include Fe, Co, V, Mn, Ti, and Cr.

Examples of the cathode active material may include a metal fluoride, a metal acid fluoride, and a simple substance of metal. Examples of the metal fluoride may include $FeF_x$ (such as $FeF_3$), $CoF_x$ (such as $CoF_3$), $VF_x$ (such as $VF_3$), $MnF_x$ (such as $MnF_3$), $TiF_x$ (such as $TiF_3$), and $CrF_x$ (such as $CrF_3$). Incidentally, the "x" is a real number lager than 0. Also, examples of the metal acid fluoride may include FeOF and VOF, and examples of the simple substance of metal may include Fe, Co, V, Mn, Ti, and Cr.

The cathode active material is preferably an active material that can be reacted by conversion or insertion. The active material that can be reacted by conversion refers to a material that exhibits its function as an active material by a reaction along with a valence change (change of a positive valence) of the metal element. The active material that can be reacted by insertion refers to a material that exhibits its function as an active material by a reaction along with the insertion of the alkali metal element.

The shape of the cathode active material is not particularly limited, and examples thereof may include a granular shape. The average particle diameter of the cathode active material ($D_{50}$) is in a range of 0.1 μm to 50 μm for example, and preferably in a range of 1 μm to 20 μm. The average particle diameter of the cathode active material ($D_{50}$) may be determined from the result of the particle distribution measurement by a laser diffraction scattering method for example.

The content of the cathode active material in the cathode active material layer is preferably larger from the viewpoint of the capacity, and is 30 weight % or more for example, preferably 50 weight % or more, and more preferably 70 weight % or more.

The cathode active material layer may further contain at least either one of a conductive material and a binder other than the cathode active material. The conductive material is not particularly limited, and examples thereof may include carbon materials. Examples of the carbon material may include carbon blacks such as acetylene black, Ketjen black, furnace black and thermal black; and graphene, fullerene, and carbon nanotube. Also, the binder is not particularly limited if it is chemically and electronically stable, and examples thereof may include fluorine-based binders such as polyvinylidene fluoride (PVDF) and polytetrafluoroethylene (PTFE). The thickness of the cathode active material layer may greatly vary in accordance with the constitution of the battery, and thus is not particularly limited.

(2) Anode Active Material Layer

The anode active material layer in the present disclosure is a layer having an anode active material that contains a metal element capable of taking a valence of +2 or more.

The anode active material contains a metal element capable of taking a valence of +2 or more. This metal element is preferably capable of taking a valence of at least one of +2, +3, +4, and +5 for example, and more preferably capable of taking at least one of +2, +3 and +4.

Examples of the metal element may include La, Ca, Al, Eu, Li, Si, Ge, Sn, In, V, Cd, Cr, Fe, Zn, Ga, Ti, Nb, Mn, Yb, Zr, Sm, Ce, Mg, and Pb.

Examples of the anode active material may include a simple substance of metal, an alloy, a metal oxide, and fluorides of these. Above all, the anode active material is preferably at least one of La, $LaF_x$, Ce, $CeF_x$, Mg, $MgF_x$, Ca, $CaF_x$, Al, and $AlF_x$. Incidentally, the "x" is a real number larger than 0.

The anode active material layer may further contain at least either one of a conductive material and a binder other than the anode active material. The same materials as the descriptions in "(1) Cathode active material layer" above may be used as the conductive material and the binder. Also, the content of the anode active material in the anode active material layer is preferably large from the viewpoint of the capacity, and is 30 weight % or more for example, preferably 50 weight % or more, and more preferably 70 weight % or more. Also, the thickness of the anode active material layer may greatly vary in accordance with the constitution of the battery, and thus is not particularly limited.

(3) Electrolyte Layer

The electrolyte layer in the present disclosure is a layer containing an alkali metal ion and fluoride anion (fluoride ion), and formed between the cathode active material layer and the anode active material layer. Examples of the alkali metal ion may include a Li ion, a Na ion, and a K ion. Above all, it is preferable that the electrolyte layer contains at least a Li ion as the alkali metal ion. Also, the electrolyte material comprised in the electrolyte layer may be an electrolyte solution (liquid electrolyte) and may be a solid electrolyte.

The liquid electrolyte contains an alkali metal salt, fluoride salt and an organic solvent for example. A typical example of the alkali metal salt is a lithium salt. Examples of the lithium salt may include inorganic lithium salts such as $LiPF_6$, $LiBF_4$, $LiClO_4$, and $LiAsF_6$, and organic lithium salts such as $LiCF_3SO_3$, $LiN(CF_3SO_2)_2$, $LiN(C_2F_5SO_2)_2$, and $LiC(CF_3SO_2)_3$. Likewise, examples of the anion for the alkali metal salt may include inorganic anions such as $PF_6^-$, $BF_4^-$, $ClO_4^-$, and $AsF_6^-$, and organic anions such as $CF_3SO_3^-$, $N(CF_3SO_2)_2^-$, $N(C_2F_5SO_2)_2^-$, and $C(CF_3SO_2)_3^-$.

Examples of the fluoride salt may include inorganic fluoride salts, organic fluoride salts, and ionic solutions. Examples of the inorganic fluoride salt may include XF (X is Li, Na, K, Rb or Cs). Examples of the cations for the organic fluoride salt may include alkylammonium cations such as tetramethylammonium cation.

The concentration of the alkali metal salt and the fluoride salt in the liquid electrolyte is, respectively, in a range of 0.1 mol % to 40 mol % for example, and preferably in a range of 1 mol % to 10 mol %. The amount of the alkali metal salt when the amount of the fluoride salt in the liquid electrolyte is regarded as 1 mol part is in a range of 0.25 mol pts. to 20 mol pts. for example, preferably in a range of 1 mol part to 15 mol pts., and more preferably in a range of 2 mol pts. to 10 mol pts.

Examples of the organic solvent may include glyme such as triethylene glycol dimethyl ether (G3) and tetraethylene glycol dimethyl ether (G4), cyclic carbonates such as ethylene carbonate (EC), fluoroethylene carbonate (FEC), difluoroethylene carbonate (DFEC), propylene carbonate (PC) and butylene carbonate (BC), and chain carbonates such as dimethyl carbonate (DMC), diethyl carbonate (DEC), and ethyl methyl carbonate (EMC). Also, an ionic solution may be used as the organic solvent.

The thickness of the electrolyte layer in the present disclosure may greatly vary in accordance with the constitution of the battery, and thus is not particularly limited.

(4) Other Constitutions

The hybrid ion battery in the present disclosure comprises at least the above described cathode active material layer, anode active material layer, and electrolyte layer, and usually further comprises a cathode current collector for collecting currents of the cathode active material layer, and an anode current collector for collecting currents of the anode active material layer. Examples of the shape of the current collectors may include a foil shape, a mesh shape, and a porous shape. Also, the hybrid ion battery may comprise a separator between the cathode active material layer and the anode active material layer. The reason therefor is to obtain a battery with higher safety.

(5) Hybrid Ion Battery

The hybrid ion battery in the present disclosure is usually a secondary battery so as to be repeatedly charged and discharged and useful as a car mounted battery for example. Also, examples of the shape of the hybrid ion battery may include a coin shape, a laminate shape, a cylindrical shape, and a square shape.

2. Controlling Portion

The controlling portion in the present disclosure has a function to control charging and discharging of the hybrid ion battery. An example of the controlling portion is controlling portion 11 shown in FIG. 2, which has ECU (Electronic Control Unit) 111 and PCU (Power Control Unit) 112. The ECU preferably has a micro controller (MCU). Also, the PCU preferably has a convertor and an inverter, and may further have a cooling structure.

The controlling portion usually controls discharging so that a potential of the cathode active material includes a potential range higher than 0.23 V (vs. SHE). In other words, the controlling portion usually controls discharging so as to conduct discharging reaction in the potential range higher than 0.23 V (vs. SHE). Meanwhile, this stipulation does not exclude discharging to 0.23 V (vs. SHE) or less, but it signifies that the discharging reaction is to be conducted so as to at least include the potential range higher than 0.23 V (vs. SHE). Incidentally, SHE refers to the standard hydrogen electrode (SHE), and V (vs. SHE) refers to the potential based on the standard hydrogen electrode. The controlling portion may control discharging so that the potential of the cathode active material includes the potential range of 0.3V (vs. SHE) or more, and may control discharging so that the potential of the cathode active material includes the potential range of 0.5 V (vs. SHE) or more. Also, the under limit of the potential of the cathode active material is −2.0 V (vs. SHE) for example. The reason therefor is that the dendrite of the alkali metal could be deposited if the potential of the cathode active material is too low.

Also, to control discharging so that the potential of the cathode active material includes the specific potential range, the potential of the cathode active material must be sufficiently increased at the time of charging. Accordingly, the controlling portion preferably controls charging so that the potential of the cathode active material becomes higher than 0.23 V (vs. SHE), may control charging so that the potential of the cathode active material becomes 0.3 V (vs. SHE) or more, and may control charging so that the potential of the cathode active material becomes 0.5V (vs. SHE) or more. The upper limit of the potential of the cathode active material is 1.8 V (vs. SHE) for example.

Also, the potential of the cathode active material is regarded as $V_c$. For example, in ECU 111 shown in FIG. 2, a range of $V_{min}$ to $V_{max}$ is stored as the specific potential range of the cathode active material. Discharging stops when $V_c$ is dropped to $V_{min}$ by discharging, and charging stops when $V_c$ reaches at $V_{max}$ by charging.

3. Secondary Battery System

The secondary battery system of the present disclosure comprises the above described hybrid ion battery and controlling portion. The hybrid ion battery before the first charge and discharge (upon the battery assembling) may be (i) in the form the cathode active material contains a F element but the anode active material does not contain a F element, or (ii) in the form the anode active material contains a F element, but the cathode active material does not contain a F element.

For example, in the hybrid ion battery before charging, the cathode active material is preferably a simple substance of metal, or a metal fluoride or metal acid fluoride reactive with a fluoride anion (fluoride ion); the anode active material is preferably a metal fluoride; and the electrolyte layer preferably contains an alkali metal ion and a fluoride anion (fluoride ion). Also, for example, in the hybrid ion battery before discharging, the cathode active material is preferably a metal fluoride or a metal acid fluoride; the anode active material is preferably a simple substance of metal; and the electrolyte layer preferably contains an alkali metal ion and a fluoride anion (fluoride ion).

Incidentally, the present disclosure is not limited to the embodiments. The embodiments are exemplification, and other variations are intended to be included in the technical scope of the present disclosure if it has substantially the same constitution as the technical idea described in the claim of the present disclosure and offers similar operation and effect thereto.

EXAMPLES

The present disclosure is hereinafter described in more details with reference to Examples.

Example 1

First, a liquid electrolyte was produced. Triglyme (G3, manufactured by KANTO CHEMICAL CO., INC.), lithium hexafluorophosphate ($LiPF_6$, manufactured by Kishida Chemical Co., Ltd.), and lithium fluoride (LiF, manufactured by Wako Pure Chemical Industries, Ltd.) were weighed and mixed so as to be $G3:LiPF_6:LiF=20:5:1$ at the molar ratio, and then stirred at 30° C. in a sealed container made of fluororesin to obtain the liquid electrolyte.

Next, a $FeF_3$ mixed electrode was produced as a cathode. $FeF_3$ (manufactured by RARE METALLIC Co., LTD.), acetylene black (AB, manufactured by Denki Kagaku Kogyo Kabushiki Kaisha), and polyvinylidene fluoride (PVdF, manufactured by Kureha Battery Materials Japan) were weighed and mixed so as to be $FeF_3:AB:PVdF=6:2:1$ at the weight ratio, and then used for coating. Thereby, the $FeF_3$ mixture electrode was obtained. Next, a Ce metal plate (manufactured by Alfa Aesar, A Johnson Matthey Company) was prepared as an anode.

A dip-type 3-electrodes cell was produced in a glove box under an Ar atmosphere. The $FeF_3$ mixed electrode was used as a working electrode and the Ce metal plate was used as a counter electrode. Also, a reference electrode was separated from the liquid electrolyte by a Vycor glass. Incidentally, the reference electrode used was a Ag line soaked in an acetonitrile solution in which silver nitrate and tetrabutylammonium perchlorate were dissolved at 0.1 M respectively. An evaluation cell was obtained in these manners.

Reference Example 1

Examined was the fluorinating and defluorinating behavior of the Ce metal plate used as the anode in Example 1. An evaluation cell was obtained in the same manner as in Example 1, except that the Ce metal plate was used as the working electrode, and a mixture electrode of carbon fluoride, acetylene black (AB), and PTFE was used as the counter electrode. Incidentally, the mixture electrode is an electrode that contains the materials at the weight ratio of carbon fluoride:AB:PTFE=7:2:1.

[Evaluation]

Figure 3:
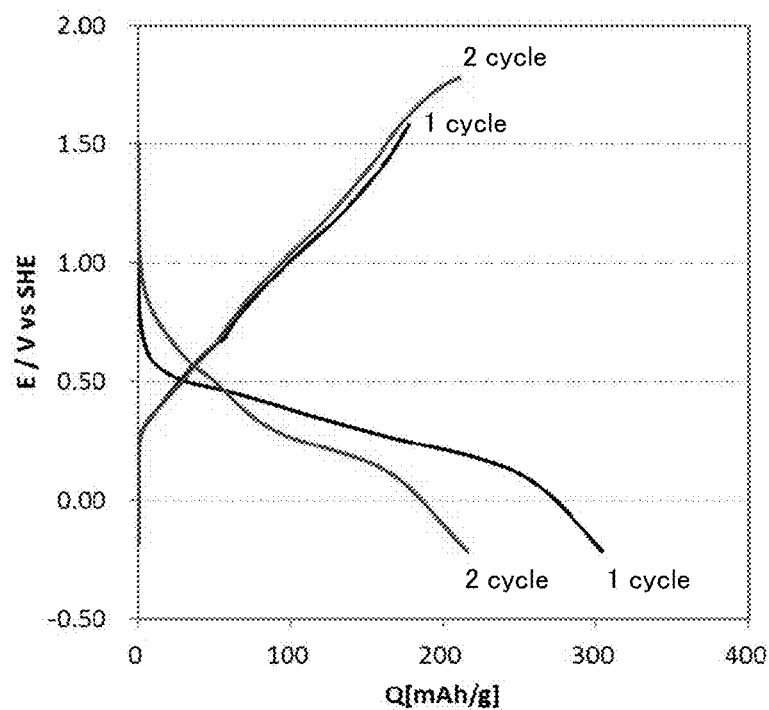
FIG. 3 is the result of a charge and discharge test for the evaluation cell obtained in Example 1.

A charge and discharge test (oxidation reduction test) at a room temperature was conducted for the evaluation cell obtained in Example 1. The discharging current was 6 μA, and the charging current was 30 μA. The result is shown in FIG. 3. As shown in FIG. 3, in Example 1, discharging reactions occurred in the range of 0.6 V (vs. SHE) to 0.2 V (vs. SHE) in the first discharging, and discharging reactions occurred in the range of 0.8 V (vs. SHE) to 0.2 V (vs. SHE) in the second discharging. The standard electrode potential of $FeF_3+3e^-\leftrightarrows Fe+3F^-$ was −0.575 V (vs. SHE); thus, it was confirmed that the discharging reactions proceeded from the potential 1 V higher than that of the standard electrode potential, in which Fe was fluorinated and defluorinated. Accordingly, it was suggested that the evaluation cell allowed high energy densification by increasing the voltage.

Figure 4:
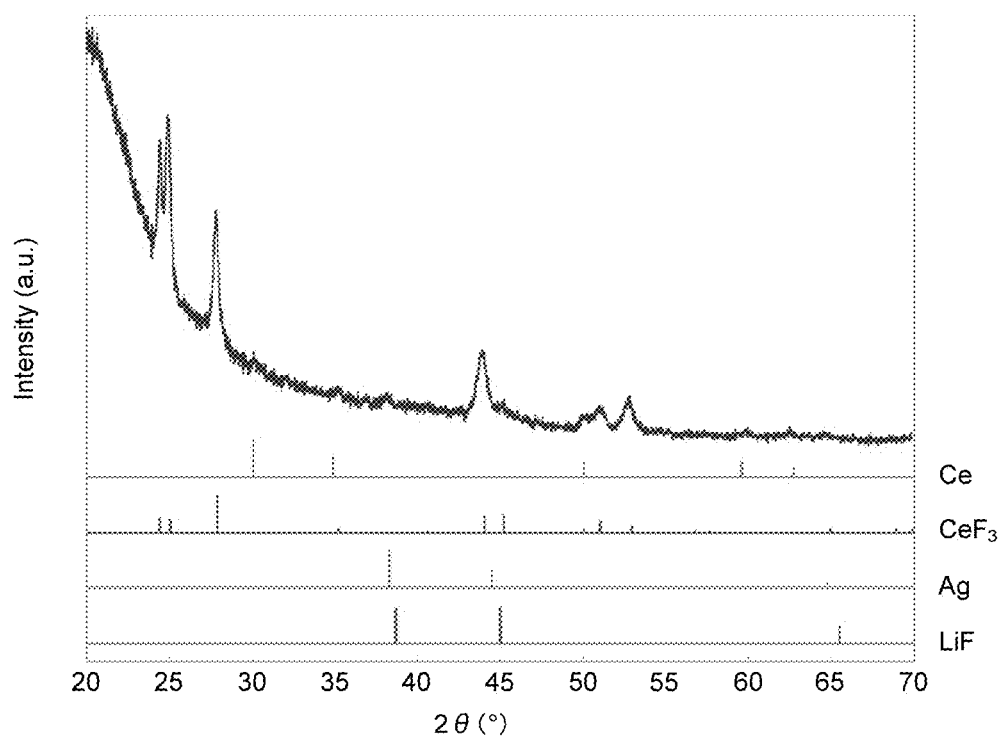
FIG. 4 is the result of an X-ray diffraction measurement for the anode after the charge and discharge test in Example 1.
Figure 5:
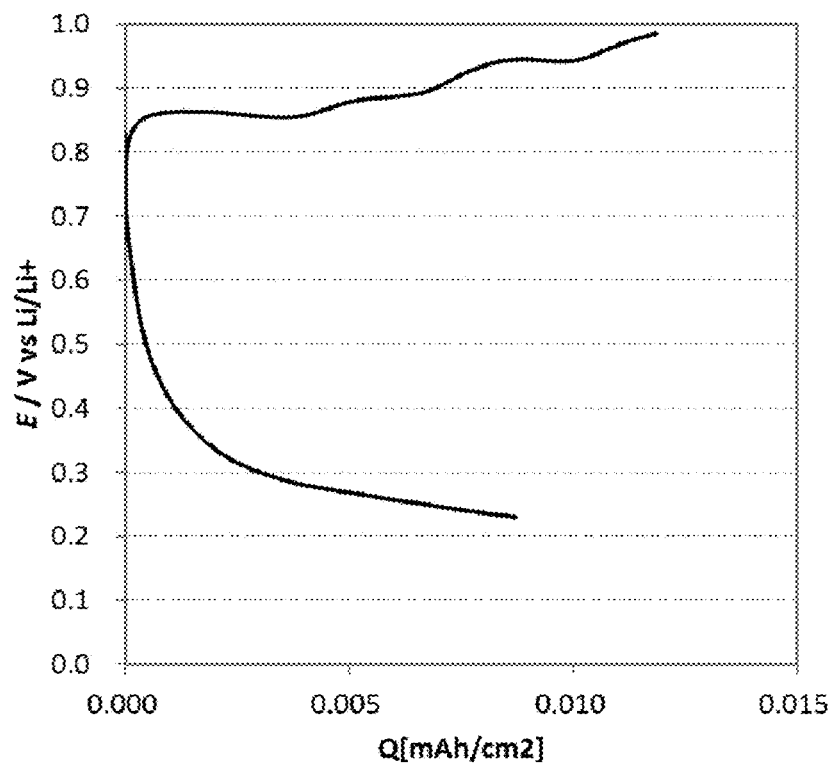
FIG. 5 is the result of a charge and discharge test for the evaluation cell obtained in Reference Example 1.

Also, an X-ray diffraction measurement was conducted for the anode after charge and discharge test in Example 1. The result is shown in FIG. 4. As shown in FIG. 4., the peaks of $CeF_3$ were confirmed, and it was confirmed that fluorination of the Ce metal plate occurred. Also, FIG. 5 is the result of a charge and discharge test for the evaluation cell obtained in Reference Example 1. As shown in FIG. 5, in Reference Example 1, charge and discharge reactions occurred at higher potentials than that of $Li^++e^-\leftrightarrows Li$ (0 V vs $Li/Li^+$), and thus it was confirmed that the fluorination and defluorination of the Ce metal plate occurred.

Example 2

A mixed solvent that contains ethylene carbonate (EC) and dimethyl carbonate (DMC) at the volume ratio of 1:1 (manufactured by Kishida Chemical Co., Ltd.), lithium hexafluorophosphate ($LiPF_6$, manufactured by Kishida Chemical Co., Ltd.), and lithium fluoride (LiF, manufactured by Wako Pure Chemical Industries, Ltd.) were weighed and mixed so as to be the mixed solvent:LiPF$_6$:LiF=20:5:1 at the molar ratio, and then stirred at 30° C. in a sealed container made of fluororesin to obtain a liquid electrolyte.

An evaluation cell was produced in a glove box under an Ar atmosphere. The liquid electrolyte obtained was used, a FeF$_3$ mixed electrode was used as the cathode, and a Ce metal plate was used as the anode. Incidentally, the FeF$_3$ mixed electrode and the Ce metal plate were the same as those in Example 1. The evaluation cell was obtained in these manners.

[Evaluation]

Figure 6:
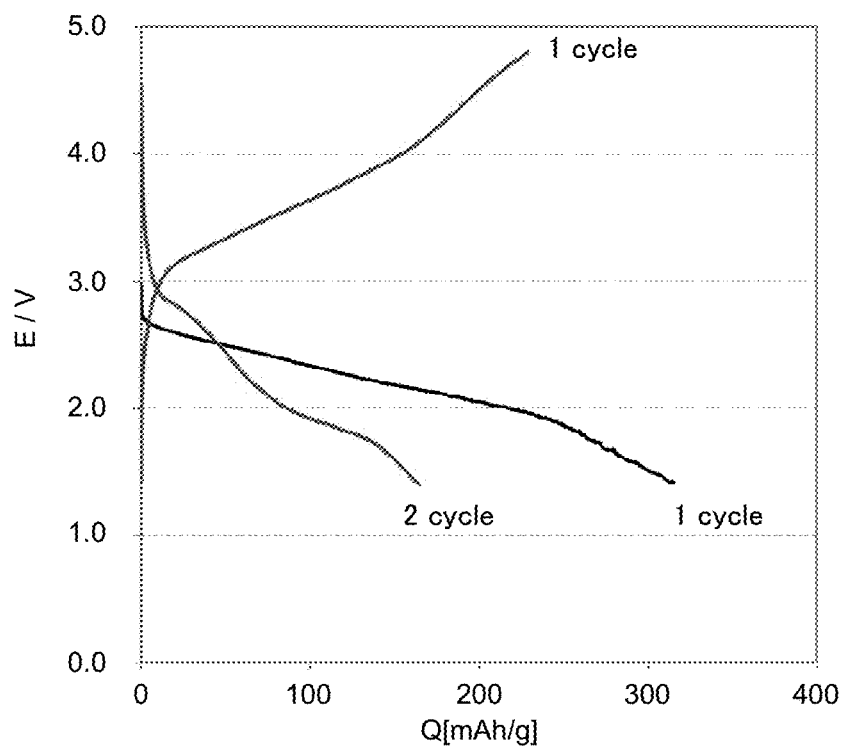
FIG. 6 is the result of a charge and discharge test for the evaluation cell obtained in Example 2.

A charge and discharge test (oxidation reduction test) at a room temperature was conducted for the evaluation cell obtained in Example 2. The discharging current was 2.5 µA, and the charging current was 5 µA. The result is shown in FIG. 6. In Example 2, the kind of the liquid electrolyte was different from that of Example 1; however, as shown in FIG. 6, charge and discharge were possible.

Example 3

An evaluation cell was obtained in the same manner as in Example 1 except that the liquid electrolyte produced in Example 2 was used and a Mg metal plate (manufactured by The Nilaco Corporation) was used as the anode.

Reference Example 2

Examined was the fluorinating and defluorinating behavior of the Mg metal plate used as the anode in Example 3. An evaluation cell was obtained in the same manner as in Example 3 except that the working electrode and the counter electrode were changed to each other (the Mg metal plate was used for the working electrode; the FeF$_3$ mixed electrode was used for the counter electrode).

[Evaluation]

Figure 7:
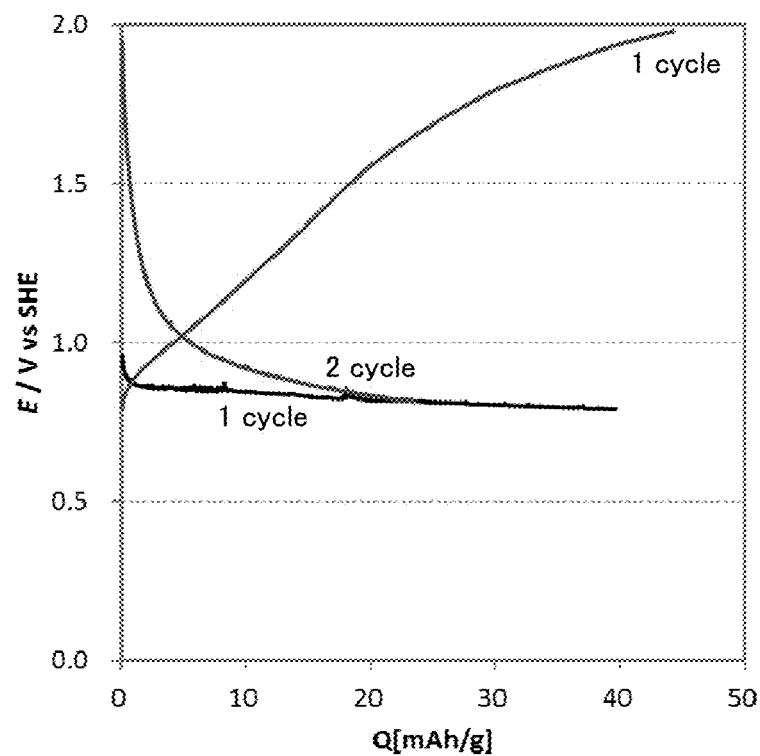
FIG. 7 is the result of a charge and discharge test for the evaluation cell obtained in Example 3.

A charge and discharge test (oxidation reduction test) at a room temperature was conducted for the evaluation cell obtained in Example 3. The discharging current was 1 µA, and the charging current was 4 µA. The result is shown in FIG. 7. In Example 3, the kind of the liquid electrolyte was different from that of Example 1; however, as shown in FIG. 7, it was confirmed that the discharge reaction proceeded from a high potential similarly to Example 1.

Figure 8:
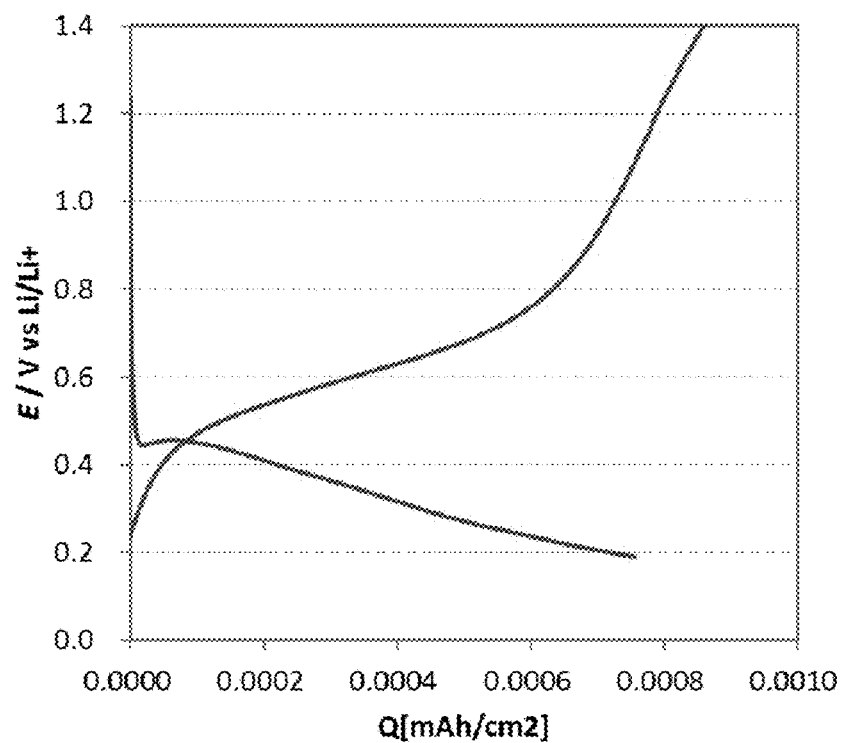
FIG. 8 is the result of a charge and discharge test for the evaluation cell obtained in Reference Example 2.

A charge and discharge test (oxidation reduction test) at a room temperature was conducted for the evaluation cell obtained in Reference Example 2. The discharging current was 0.5 µA, and the charging current was 1 µA. The result is shown in FIG. 8. As shown in FIG. 8, in Reference Example 2, the charge and discharge reactions occurred at higher potentials than that of Li$^+$+e$^-$⇌Li (0 V vs Li/Li$^+$), so that it was confirmed the fluorination and defluorination of the Mg metal plate occurred.

REFERENCE SIGNS LIST

1 cathode active material layer
2 anode active material layer
3 electrolyte layer
4 cathode current collector
5 anode current collector
6 battery case
10 hybrid ion battery
11 controlling portion
12 load
13 power source
20 secondary battery system

What is claimed is:

1. A secondary battery system comprising:
a hybrid ion battery provided with a cathode active material layer having a cathode active material that contains a first metal element capable of taking two kinds or more of a positive valence and reacts with a fluoride ion (F$^-$), an anode active material layer having an anode active material that contains a second metal element, which may be the same as or different from the first metal element, capable of taking a valence of +2 or more and reacts with a fluoride ion (F$^-$), and an electrolyte layer containing a lithium ion and a fluoride ion (F$^-$), and formed between the cathode active material layer and the anode active material layer; and
a controlling portion that controls charging and discharging of the hybrid ion battery;
wherein the controlling portion controls discharging so that a potential of the cathode active material includes a potential range higher than 0.23 V (vs. SHE);
wherein the electrolyte layer is a liquid electrolyte comprising a lithium salt, a fluoride salt and an organic solvent;
wherein the first metal element is Fe,
wherein an amount of the lithium salt, when an amount of the fluoride salt in the liquid electrolyte is regarded as 1 mol part, is in a range of 2 mol parts to 10 mol parts;
wherein the cathode active material is FeF$_3$ or Fe;
wherein the anode active material is Ce or CeFx, the x being a real number larger than 0; and
wherein the cathode active material layer further contains fluorine-based binder, and a carbon material.

2. The secondary battery system according to claim 1, wherein the cathode active material is at least one of a metal fluoride, a metal acid fluoride, and a simple substance of metal.

3. The secondary battery system according to claim 1, wherein the electrolyte layer contains an inorganic fluoride salt including F$^-$ as anion.

4. The secondary battery system according to claim 3, wherein the inorganic fluoride salt is XF, wherein X is Li, Na, K, Rb or Cs.

5. The secondary battery system according to claim 3, wherein the inorganic fluoride salt is LiF.

6. The secondary battery system according to claim 1, wherein the electrolyte layer contains an organic fluoride salt including F$^-$ as anion.

7. The secondary battery system according to claim 1, wherein the amount of the lithium salt, when the amount of the fluoride salt in the liquid electrolyte is regarded as 1 mol part, is in a range of 5 mol parts to 10 mol parts.

* * * * *